Figure 1:
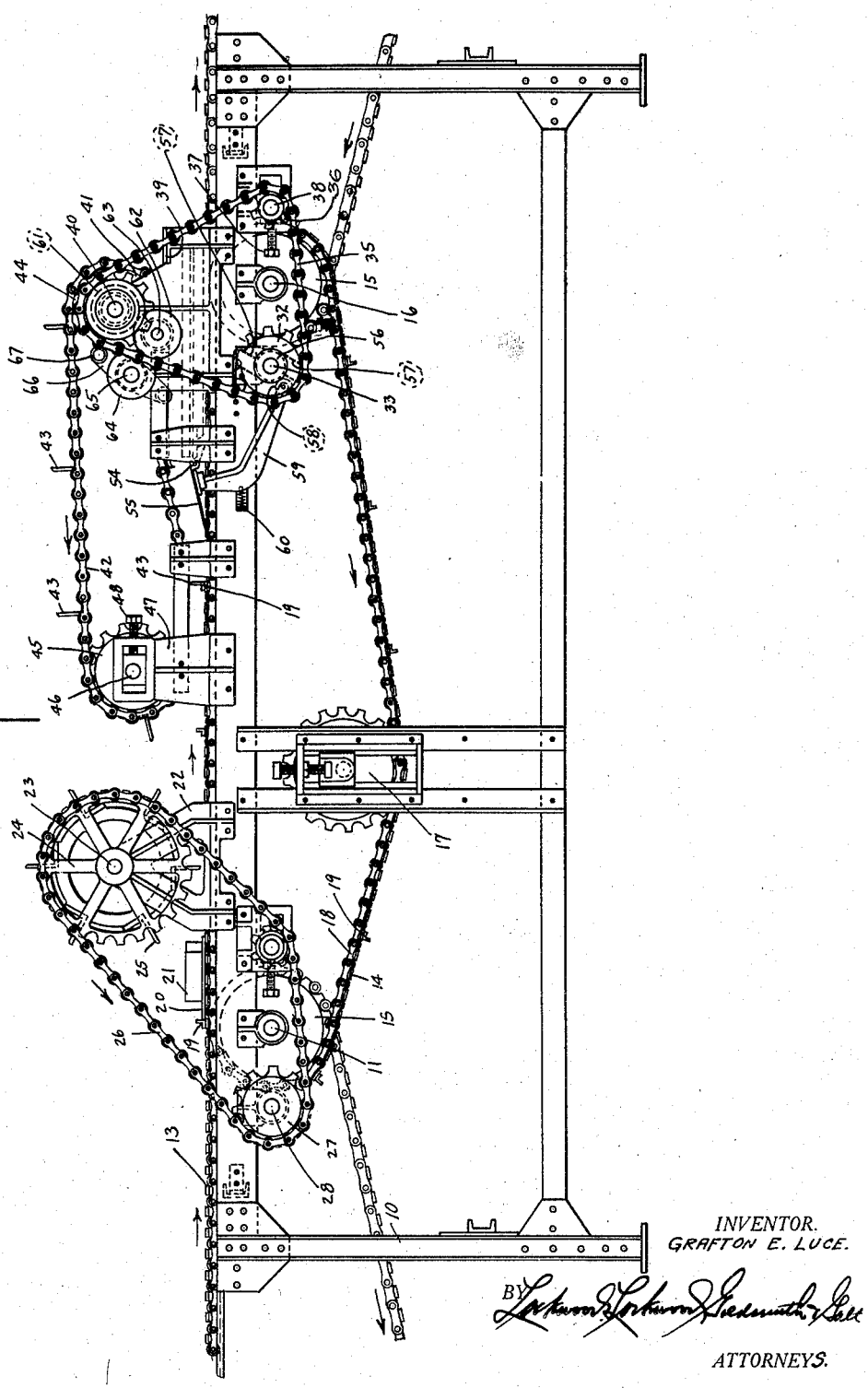

Feb. 11, 1930.　　G. E. LUCE　　1,746,664
BRICK EDGER
Filed Dec. 2, 1927　　2 Sheets-Sheet 1

INVENTOR.
GRAFTON E. LUCE.
BY
ATTORNEYS.

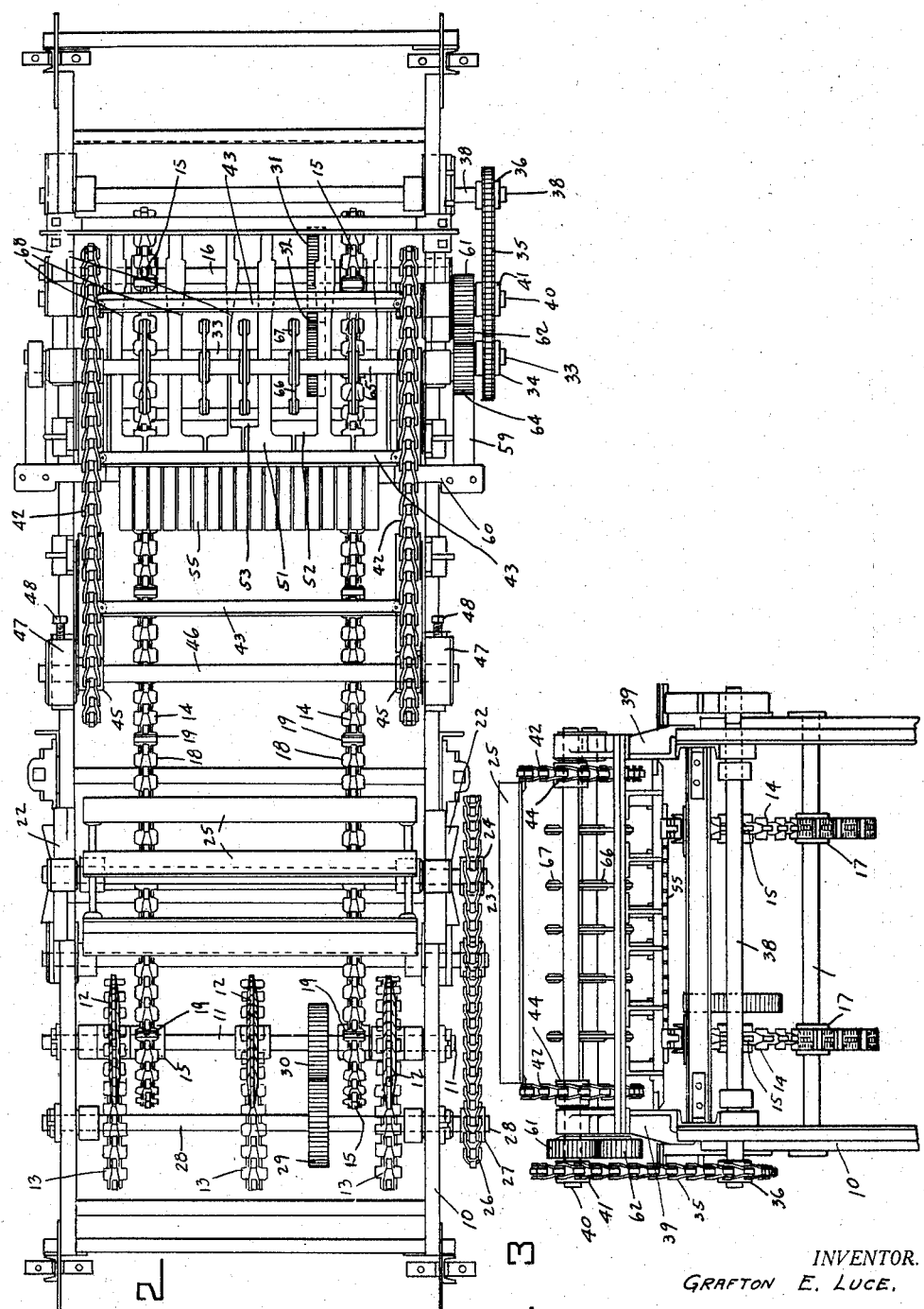

Patented Feb. 11, 1930

1,746,664

UNITED STATES PATENT OFFICE

GRAFTON E. LUCE, OF CHICAGO, ILLINOIS, ASSIGNOR TO LANCASTER IRON WORKS, INC., OF LANCASTER, PENNSYLVANIA, A CORPORATION OF PENNSYLVANIA

BRICK EDGER

Application filed December 2, 1927. Serial No. 237,191.

This invention relates to a brick conveying and edging machine for the handling of brick on pallets and arranging the same thereon in proper position for hacking purposes.

The principal object of the invention ressides in a mechanism for conveying a pallet upon which a plurality of bricks have been positioned with their largest faces down and their side edges adjacent each other, aligning the brick on a pallet and positioning the forward edge thereof in predetermined spaced relation with the forward edge of the pallet, so as to permit the separation therefrom and cause the brick to be turned 90° so as to be faced in pairs, which pairs are positioned in spaced relation with each other, and causing the edged pairs of brick to be deposited upon the same pallet from which they were removed, which pallet with its properly edged and positioned brick is carried by the conveyor to the hacking machine. Thus, the same pallet from which the bricks have been removed is advanced to a position to receive them after being edged, so as to provide a suitable receiving platform, the operation being conducted at the same speed of travel so that there will be no bunching or variation in the respective positions of the pallets, before and after the edging operation.

The full nature of the invention will be understood from the accompanying drawings and the following description and claims:

In the drawings Fig. 1 is a side elevation of a machine embodying the invention. Fig. 2 is a top plan view thereof. Fig. 3 is an end view looking toward the discharge end.

In the drawings 10 indicates in general a suitable frame work which supports a shaft 11 mounting the driving wheels 12 of an endless conveyor 13 which is adapted to convey pallets to the device in centered and aligned relation with the brick in spaced and aligned relation thereon relative to the pallet, as set forth in copending application, Serial No. 265,439, filed March 28, 1928.

The pallets are discharged from the conveyor 13 to the conveyor 14 which is mounted on the sprocket wheels 15 carried by shaft 11 and by shaft 16. The upper run of the conveyor construction 14, which is of link belt type and includes parallel belts, lies substantially horizontal. The lower run includes a tension device indicated generally by the numeral 17, which is mounted on the frame 10.

Each link of the main conveyor 14 includes a plurality of attachments 18 which support the pallet at predetermined distances on said belt. An angular lug 19 is provided which constitutes a pallet-propelling device and engages the back edge of the pallet indicated by the numeral 20, the same having brick 21 positioned thereon largest faces down, ends foremost. The brick may be offset from each other or may be transversely aligned with each other. So far as the present device is concerned, it is adapted to handle brick in either arrangement although the latter arrangement is preferred.

Mounted in the vertical extensions 22 of the frame 10 there is a shaft 23 which carries a driving sprocket 24 for driving a spacing wheel including the transversely-arranged paddles 25. The sprocket chain 26 or power belt is driven by a sprocket wheel 27 carried by shaft 28, which carries a gear 29 meshing with the gear 30 carried by the shaft 11. Thus the timing device, which is essentially the spacing wheel, is operable in timed relation with the conveyor 14. The paddles 25 also have the function of engaging the forward edge of brick 21 and retarding the same sufficiently to align the brick transversely, and move them to the rear edge of the pallet, reference being had to the line of travel.

Shaft 16 which mounts the sprocket wheels 15, also mounts a spur gear 31 that meshes with a spur gear 32 carried by shaft 33. Shaft 33 is extended, and upon the end thereof there is mounted a sprocket wheel 34 driving a sprocket chain 35 which runs over an adjustably mounted sprocket wheel 36, the adjustment being obtained by the set screw 37 operating through the bearing which mounts the shaft 38 supporting said sprocket gear 36. In the vertical standard 39, there is mounted a shaft 40 carrying a sprocket gear 41, over which the driving chain 35 passes. Also mounted on said shaft there is another endless belt construction in the form of a pair of link belts 42, connected by a paddle construction of transverse slats 43. Belts 42 are mounted on the sprockets 44 carried by shaft 40 and on sprockets 45 carried by shaft 46, which are adjustably mounted in the vertical standard 47 by means of the set screw 48. The slats 43 serve to advance the brick with the pallet, the main conveyor and paddle operating in timed relation therewith.

Extending transversely across the main framework 10 and supported by the auxiliary frame construction 39 there is a platform 51, the same having slots 52 and 53 therein, 52 indicating multiple brick receiving slots and 53 a single brick receiving slot. Pivotally mounted at 54, there is a platform 55 comprising a plurality of leaf springs which terminate in the plane of the pallet. Mounted on shaft 33, there are two cams 56 at opposite sides of the machine which have the raised portions 57 adapted to engage cam followers in the form of rollers 58 rotatably supported in arms 59. The arms 59 are supported by a platform actuating bar 60 that extends across the framework 10 transversely of the line of travel and are adapted to raise and elevate the spring approach platform 55 at predetermined intervals in timed relation with the main conveyor. A spring 60 is associated with each arm 59 for normally maintaining the follower 58 in engagement with the cam.

The operation is as follows:

It will be noted that the pallet 20 is advanced by one of the lugs 19, and that the pallet has been previously aligned and positioned relative to the line of travel of the conveyor 14, and that the bricks have been positioned thereon largest faces down, ends foremost and sides abutting. While passing beneath the spacing wheel, the brick are moved to the rear end of the pallet in transverse alignment, with the front edge of the brick extending transversely of the line of travel. Leaving the spacing wheel, the brick and pallet pass beneath the overhead conveyor 42, whereupon the slats 43 engage the brick in timed relation with the engagement of the pallet by the lugs 19, and as the front edge of the pallet approaches the yielding approach platform 55, the platform is raised to clear the front edge of the pallet to permit it to pass therebeneath. Immediately thereafter the front edge of the platform descends and bears upon the front portion of the pallet. The pallet then passes beneath the platform 55 while the brick pass over the same, such separation and continuing forward movement being obtained by lugs 19 and the slats 43. The brick are further advanced upon the main platform 51 by the continued forward movement of the respective slats 43, while the pallet is carried beneath said platform.

The brick then reach the openings 52 and 53. One edge of each brick is supported on the platform between the openings and since the sides of the brick are in abutting relation they tend to bridge the openings until their rear edges have reached the openings. The brick then fall into the openings 52 and 53 causing them to be turned 90 degrees or from a faced position to a side position so that they are then supported on their side surface, this action generally being termed "edging". This action also arranges the brick in spaced relation. Each opening 52 positions a pair of brick in spaced relation with the adjacent brick or pair of brick. The brick fall through the openings 52 and 53 in the aforesaid relation and are deposited upon the pallet in predetermined position, which by this time has also been moved to a position beneath the openings.

To insure the positive deposition of the brick by the edging device, shaft 40 mounts a gear 61 which meshes with a gear 62 mounted at 63 which meshes with the gear 64 mounted on the end of shaft 65. Shaft 65, supported in the auxiliary framework 39, carries a plurality of brick engaging members in the form of striking arms 66, with strikers 67 upon the ends thereof adapted to strike each pair of brick on their upper surfaces at the line of contact with each other. Herein the arms are shown diametrically positioned and such brick as fail to fall through the openings 52 or 53 by gravity are forcibly passed through said openings by the strikers 67 engaging the same in timed relation with the positioning of the brick over said openings.

Following deposition of the brick, after passing through the edging and spacing device, the pallet is moved forwardly from the same by further advance of the main conveyor belt 14.

In passing under the spacing wheel, all of the brick on each pallet are moved to the rear of the pallet leaving the forward edge clear with the brick having their front edges aligned transversely to the line of travel. After passing the spacing wheel, the brick and pallet continue forwardly between the two parallel chain conveyors, the lower run of the upper chain advancing the brick and the upper run of the lower chain advancing the pallet simultaneously. When the pallet arrives at the inclined platform, the platform is dropped onto the edge of the pallet, and the continued forward movement of the two conveyors causes separation of the brick and pallet. The brick pass upwardly over the inclined platform and the main platform until they register over the series of openings, the edges of which support the outer edges of brick leaving the inside edges of the brick unsupported. When thus arranged the brick are dropped, or are forced through the openings onto the same pallet therebeneath which continues to serve as a conveyor for transmitting the brick to the hacking machine. In case of an odd number of brick, the odd brick is dropped or forced through a one-brick opening and may be turned either way as desired. The aforesaid arrangement permits the edging of the brick in the desired relation.

The invention claimed is:

1. In combination, a platform adapted to receive a plurality of brick and discharge the same in predetermined relation, said platform having a plurality of apertures arranged in predetermined relation, and a striking member adapted to strike the upper surfaces of the brick for causing them to tumble through their respective apertures and be turned onto their side edges by means thereof.

2. In an edging device the combination of an apertured platform, the apertures thereof being arranged in spaced relation, and striking means associated with each aperture for turning approximately 90 degrees an article passing therethrough.

3. In combination, a brick receiving platform adapted to receive a plurality of brick arranged in faced relation, said platform having a plurality of parallel openings, each being slightly less in width than a pair of faced brick, means for moving the brick along the platform into registration with said openings so that the inner edges of a pair of faced brick remain unsupported, permitting the brick upon the continued movement along the platform to turn inwardly toward each other and upon their side edges to be deposited in edged position.

4. A combination as defined by claim 3 with the addition of means for forcibly moving the brick through said parallel openings.

In witness whereof, I have hereunto affixed my signature.

GRAFTON E. LUCE.